United States Patent [19]
Collins

[11] 3,780,570
[45] Dec. 25, 1973

[54] ULTRASONIC INSPECTION DEVICE

[75] Inventor: Jack T. Collins, Boulder, Colo.

[73] Assignee: Automation Industries, Inc., El Segundo, Calif.

[22] Filed: Mar. 2, 1970

[21] Appl. No.: 14,806

Related U.S. Application Data

[63] Continuation of Ser. No. 587,573, Oct. 18, 1966, abandoned.

[52] U.S. Cl. .............................. 73/67.5 R, 73/67.9
[51] Int. Cl. ........................................... G01n 29/04
[58] Field of Search ................... 73/67.5, 67.7, 67.9, 73/71.5, 67.6

[56] References Cited
UNITED STATES PATENTS

| | | | |
|---|---|---|---|
| 2,484,623 | 10/1949 | Heising | 73/67.7 |
| 2,532,781 | 12/1950 | Petersen | 73/70.1 |
| 3,009,353 | 11/1961 | Erdman | 73/67.9 |
| 3,074,267 | 1/1963 | Martin | 73/67.5 |
| 3,122,720 | 2/1964 | Morse | 340/3 |
| 3,229,508 | 1/1966 | Sharpe et al. | 73/67.5 |
| 3,238,767 | 3/1966 | Clynes | 73/67.9 |
| 3,327,523 | 6/1967 | Kelemencky et al. | 73/71.5 |
| 3,373,602 | 3/1968 | Wendt et al. | 73/67.5 |
| 3,384,767 | 5/1968 | Arnold et al. | 310/8.5 |

FOREIGN PATENTS OR APPLICATIONS

142,468   1/1961   U.S.S.R.

*Primary Examiner*—Richard C. Queisser
*Assistant Examiner*—John P. Beauchamp
*Attorney*—Don R. Sandler

[57] ABSTRACT

An ultrasonic device for nondestructively testing flat, bonded panels such as plywood or particle board panels. A transmitting set of roller type ultrasonic transducers are positioned on one side of a workpiece-transporting line, while the receiving transducers are placed on the other side of the line. Transmitters supply an ultrasonic pulse signal to each transmitting transducer. If the panel is well bonded, the associated receiving transducer receives the ultrasonic signal. A clock controls the actuation of the transmitters, turns off the transmitters, and after a time delay, turns on the receivers, responding to reverberations in a good panel. A panel marking device is actuated if a received signal is not present due to a defect in the panel.

4 Claims, 7 Drawing Figures

ULTRASONIC INSPECTION DEVICE

CROSS REFERENCE TO RELATED APPLICATIONS

This is a continuation of co-pending application Ser. No. 587,573 filed Oct. 18, 1966, now abandoned, in the name of Jack T. Collins, for Ultrasonic Material Tester and assigned of record to Automation Industries, Inc.

The present invention relates to nondestructive testing and more particularly to ultrasonic nondestructive testing systems especially adapted for inspecting laminated structures such as plywood panels etc. for hidden defects.

There are a wide variety of testing systems capable of inspecting materials or workpieces for hidden defects. At the present time the most common or widely used systems are probably of the so-called ultrasonic type wherein high frequency or ultrasonic energy is coupled into the workpiece. Ultrasonic energy is similar to audible sound in that it includes mechanical vibrations. However the frequency is above the response level of the human ear and in a region where the energy is highly attenuated as it is propagated through air. If the test object is acoustically homogeneous ultrasonic energy will travel therethrough at an essentially uniform velocity with little or no attenuation. However, if there is an acoustical discontinuity such as a void or crack the energy is reflected from the discontinuity or is attenuated thereby. In the echo type of system the energy reflected from the discontinuity is received and from this a determination as to the characteristics as to the workpiece are made. In a so-called through transmission system the failure of the ultrasonic energy to pass completely through the workpiece is indicative of the energy being reflected from or absorbed by a discontinuity.

Ultrasonic test systems of the foregoing type are being extensively used in a wide variety of different applications for reliably locating defects. However because of some of the peculiarities of ultrasonic energy the testing of certain types of workpieces present problems. When the object to be tested is traveling at a high rate of speed it becomes difficult to acoustically couple the transducers to the workpiece. For example in testing laminated panels such as plywood panels, the finished panels are frequently carried on a conveyor at relatively high velocities. In addition the panels are frequently unevenly spaced whereby they pass an inspection station at irregular and unpredictable intervals.

Since ultrasonic energy is highly attenuated by even thin air pockets within the panel it is possible to detect voids, delaminations, lack of proper gluing etc. However by the same token it is essential that the transducers for transmitting and/or receiving the energy be in direct contact with the panel of the workpiece without any air space therebetween. Because of the high velocity of the panels and frequently irregular spacing on the conveyor it has been very difficult, if not impossible, to reliably couple the transducers to the panel.

Recently a system such as disclosed and claimed in copending application Ser. No. 457,600, filed May 21, 1965 in the name of Jack T. Collins and assigned of record to Automation Industries, Inc., now U.S. Pat. No. 3,423,991, has been developed for inspecting test pieces such as plywood panels. In that system roller type transducers were provided for contacting the panel and traveling therealong so as to transmit ultrasonic energy into and/or through the panel. Although the system was highly effective to test plywood panels it possessed certain limitations requiring substantially flat, smooth panels, particularly when employed in the high production inspection of plywood panels.

The present invention provides means for overcoming the foregoing difficulties and limitations. More particularly the present invention provides an ultrasonic test system which is particularly adapted for testing plywood panels at a high production rate. In the single embodiment of the invention disclosed herein the system is very reliable and durable even when employed in a typical plywood mill. The system is capable of reliably detecting discontinuities in plywood panels and marking only those panels which do not satisfy preselected conditions.

These and other features and advantages of the present invention will become readily apparent from the following detailed description of a single embodiment thereof, particularly when taken in connection with the accompanying drawings wherein.

Figure 1:
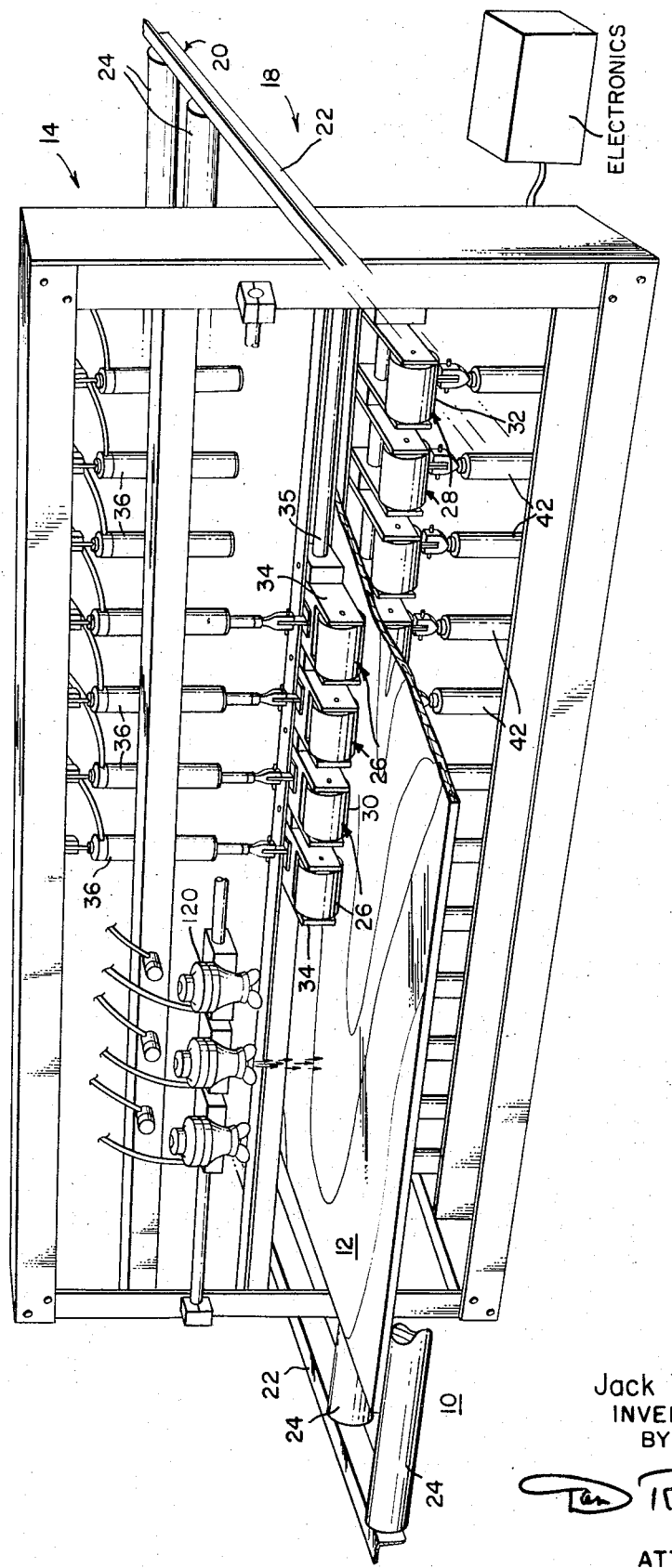
FIG. 1 is a perspective view of an ultrasonic test system embodying one form of the present invention.
Figure 4:
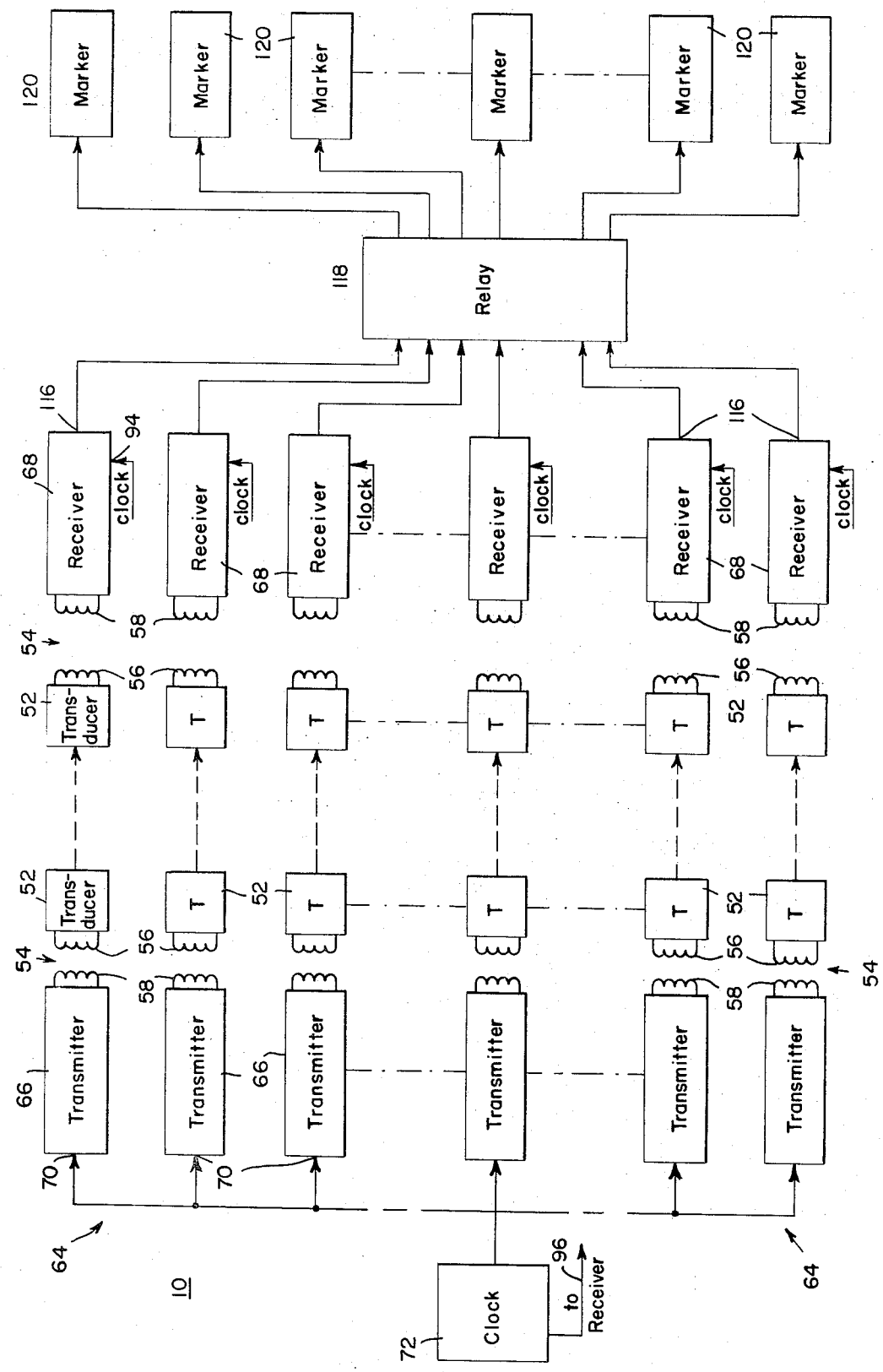
FIG. 4 is a block diagram of the test system.

Referring to the drawings in more detail and particularly to FIG. 1 and FIG. 4, the present invention is particularly adapted to be embodied in an ultrasonic system 10 for inspecting workpieces for internal defects. Although this system 10 may be utilized for testing a wide variety of different types of workpieces in the present invention it is especially useful on a production line or similar installation for inspecting a long continuous workpiece or a series of similar but discontinuous workpieces at a high rate of speed.

More particularly, for purposes of illustration, the present invention is adapted to be incorporated into an inspection station 14 for inspecting relatively thin panel members, such as plywood panels 12 as they are being manufactured. The inspection station 14 is effective to inspect each of the panels 12 for internal defects and to mark them if they are not of acceptable quality.

In the manufacture of plywood panels 12 several individual layers of wood or wood veneers are spread with glue and compressed together until the glue sets. The strength of the finished panel 12 is, of course, dependent upon all of the laminations being adequately bonded together. In the event one or more of the laminations are not properly bonded (for example an inadequate amount of glue was applied) there will be a void or air space 16 between the unbonded laminations.

A panel 12 having a delamination 16 should be down graded as to its quality, or rejected, depending upon the nature and size of the defect. In heavily stressed and/or permanent panels it may be desirable that there be no significant unbonded areas for example more than 2 inch square. However, in other instances, such as a temporary structure wherein the panel 12 is very lightly stressed, extensive delaminated areas are normally not considered a major defect. The present system 10 scans the panels 12 and marks them with sufficient information to permit the panels being sorted according to their quality.

The present test system 10 is particularly adapted to be mounted upon or adjacent to the production line so as to form an intergral part thereof. For example, the system 10 may be located on a conveyor 20 immediately following the sander whereby the finished panels 12 are carried through the inspection station 14. The conveyor 20 normally includes a pair of side rails 22 and a plurality of rollers 24 that extend between the side rails 22. These rollers 24 define a moving surface for supporting the panels 12. These rollers 24 may be free running or power driven whereby the panel 12 can be carried along the conveyor 20 at a high rate of speed.

The panels 12 traveling along the conveyor 20 are normally traveling at a relatively high rate of speed, such as up to 10 or 15 MPH. Frequently the panels 12 leave the sander at irregular intervals whereby the successive panels 12 are sometimes separated by extended open spaces and sometimes they are very close. In fact, not infrequently two or more panels may be stacked upon each other. In the event the panels become stacked upon each other the present system 10 cannot inspect them satisfactorily and it becomes necessary to close down the line and the jamup cleared.

Although the system 10 may be operated in a pulse-echo mode, in the present instance it operates in the through transmission mode. Accordingly a transmitting search unit 26 is provided on one side of the panel 12 while a receiving search unit 28 is mounted on the opposite side of the panel 12. The transmitting and receiving search units 26 and 28 are substantially identical. In order to increase the sensitivity and resolving power of the system 10 a plurality of sets of transmitting and receiving search units are provided across the width of the panel 12. Each search unit includes a roller 30 or 32 which is adapted to roll across the surface of the panel 12. Normally these rollers 30 and 32 are on the order of about 2 inches long and are normally spaced on the order of about 2 inches apart. As a consequence on a 48 inch wide panel 12 there will be about 12 separate transmitting search units and 12 separate receiving search units.

Each pair of transmitting and receiving search units 26 and 28 will inspect a strip about 2 inches wide while a 2 inch strip on each side remains uninspected. It can be seen that an unbonded area in one of the uninspected strips will not be detected. However it cannot have a width materially in excess of 2 inches. Normally an unbonded area of this magnitude is not particularly objectionable. However if such an area is of objectionable size a larger number of more closely spaced sets of search units may be utilized.

Figure 2:
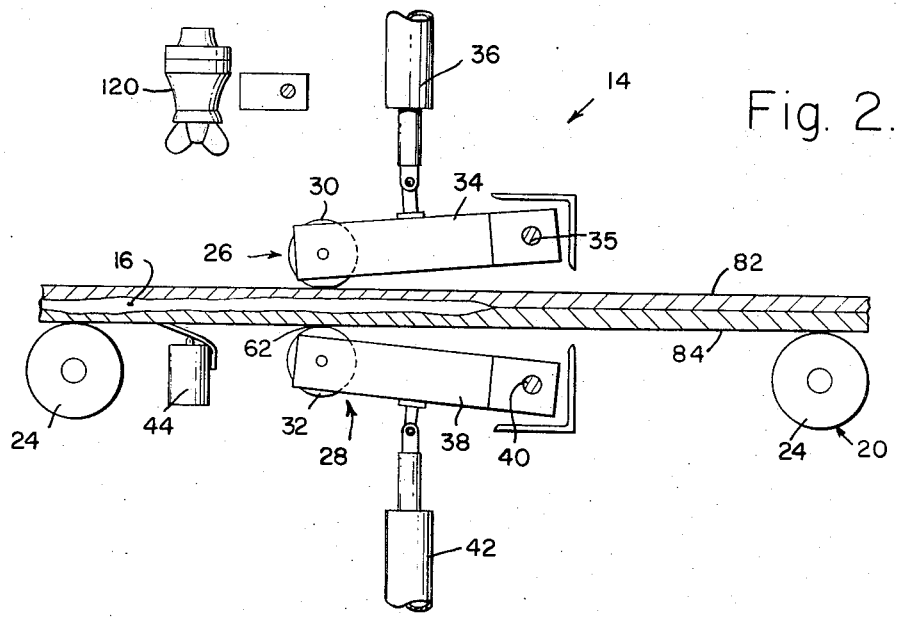
FIG. 2 is a side view on an enlarged scale, of the search unit portion of the system of FIG. 1.
Figure 3:
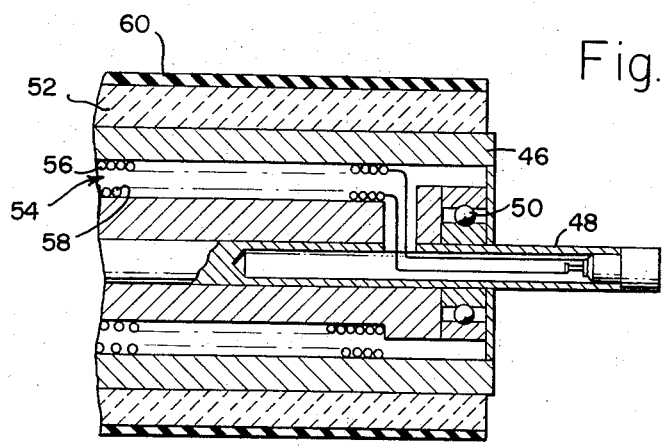
FIG. 3 is a fragmentary cross sectional view of a portion of one of the search units in FIG. 2.

As illustrated in FIG. 2, each of the transmitting search units 26 is mounted upon a separate arm 34 that is pivotally mounted upon a support 35 extending over the conveyor 20. The transmitting arms 34 are connected to a pneumatic cylinder 36 whereby the search units 26 may be individually raised away from the conveyor 20 or lowered to compress the rollers 30 downwardly against the surface of the panel 12.

Each of the receiving search units 28 is mounted upon a similar separate arm 38 pivotally mounted on a support 40 that extends beneath the conveyor 20. Separate pneumatic cylinders 42 are provided for lowering the receiving arms 38 so as to move the search units 28 into a retracted position spaced from the panel 12 and raising the arms 38 so as to compress the rollers 32 upwardly against the bottom surface of the panel 12.

A device such as a microswitch 44 may be disposed adjacent the inspection station 14 for sensing the passage of a plywood panel 12. When no panels are in the test position the search units 26 and 28 are retracted. However, as soon as the leading edge of the panel 12 enters the inspection station 14 air is fed to the cylinders 36 and 42 and the search units 26 and 28 are extended against the panel 12. As soon as the trailing edge passes the test position the switch 44 releases the air whereby the search units 26 and 28 are again retracted.

The search units 26 and 28 are preferable of the type disclosed in co-pending application Ser. No. 457,600, now U.S. Pat. No. 3,423,991, disclosed hereinabove. All of the search units (including the transmitting and receiving ones) are substantially identical. Each search unit includes a drum 46 mounted upon a spindle 48 by suitable ball bearings 50. Each of the spindles 48 is carried by one of the arms 34 or 38.

An ultrasonic transducer 52 is mounted on the drum 46 so as to rotate therewith. This transducer 52 may be of any desired variety but it is normally a device such as a piezoelectric crystal. When an appropriate electrical driving signal is applied to the opposite side of such a crystal, the crystal mechanically vibrates and radiates ultrasonic energy from the active surface. Conversely when the ultrasonic energy is incident upon the active surface the resultant mechanical vibrations cause a corresponding electrical signal to be generated between the opposite surfaces of the crystal.

The present transducer 52 is a substantially cylindrical member which fits snugly over the exterior of the drum 46. Suitable electrodes are applied to the opposite sides of the crystal. Although the rotating crystal may be coupled to the stationary structure by slip-rings etc. a rotating transformer 54 is employed. This transformer 54 includes a first winding 56 mounted on the inside of the drum 46 so as to rotate therewith.

The opposite ends of the winding 56 are connected directly to the electrodes on the crystal. The second transformer winding 58 is mounted in a fixed position on the spindle 48 substantially concentric to the other winding 56. It will be seen the two windings 56 and 58 are inductively coupled together whereby the signals may be transferred therebetween. However there are no sliding contacts that might produce "noise" in the signals.

In order to acoustically couple the transducers to the surface of the panel 12 a wear receiving member such as a tire 60 may be provided around the outer or active face of the transducer 52. This tire 60 may be permanently mounted on the outside of the transducer 52, such as by bonding it directly thereto. However it has been found desirable to be able to slide the tire 60 on and off with a minimum amount of difficulty so as to facilitate replacing it.

The tire 60 is preferably made from a resilient material transparent to ultrasonic energy. Also the acoustical impedance of the tire 60 should closely match that of the transducer 52. By way of example the tire 60 may be made from rubber, polyurathane etc. Since the tire 60 is resilient it will tend to deform slightly and form a somewhat enlarged "flat" 62 on the surface of the panel 12. Also the surface of the "flat" 62 will conform to minor surface irregularities such as the grain in the wood etc. This greatly reduces or eliminates any air space between the tire 60 and the panel 12. As a consequence the transducer 52 is intimately acoustically coupled to the panel 12.

The amount of pressure in the pneumatic cylinders 36 and 42 and the mechanical advantage etc. determine the amount of force compressing the tire 60 against the panel surface 12. Normally the amount of force is sufficiently large to insure the tread or wear receiving surface tightly engaging the panel 12 and being coupled thereto.

However the amount of force applied by the transmitting and receiving search units 26 and 28 to the opposite sides of the panel should not be large enough to compress any unbonded delamination 16 together. If this should occur the panel 12 will always appear to be properly bonded together even though when unstressed the laminations are separated by an air space.

The electrical portion of the test system 10 is shown in block form in FIG. 4. This system 10 includes a separate channel 64 for each set of transmitting and receiving search units 26 and 28. Although the present tester 10 includes 12 separate sets of search units the block diagram has been simplified so as to show only a portion of all of the channels 64. The channels 64 are all substantially identical with each one including a transmitter 66 and a receiver 68.

The transmitters 66 may be of essentially conventional variety capable of producing driving signals suitable for exciting the transducers 52 into radiating ultrasonic energy whenever a timing signal is applied to the control input 70.

Figure 6:
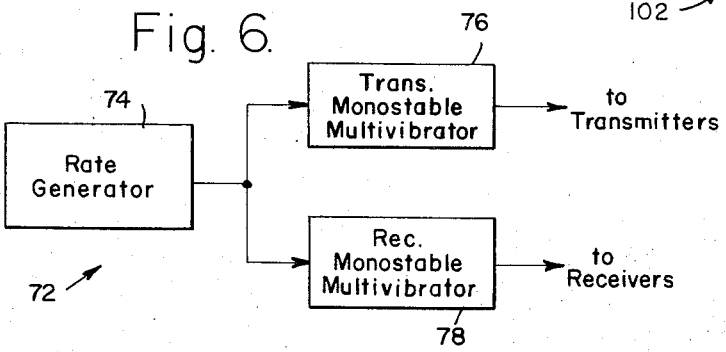
FIG. 6 is a block diagram of the clock or timing means for the system.

All of the control inputs 70 are interconnected with a clock 72 similar to that shown in block form in FIG. 6. This clock 72 includes a rate generator 74 which produces a series of substantially periodic timing signals. These timing signals control the repetition rate of the system 10. A transmitting multivibrator 76 and a receiving multivibrator 78 are coupled to the rate generator 74 so as to be responsive to the timing signals.

These two multivibrators 76 and 78 are of the monostable variety and each time a timing signal occurs they will produce square wave pulses of particular duration. It can be appreciated these pulses are precisely phase locked with each other. For reasons that will be explained subsequently the pulse from the receiver multivibrator 78 commences simultaneously or even slightly before the pulse from the transmitter multivibrator 76. Also, this pulse terminates somewhat after the transmitter pulse. Each time the square wave pulse from the clock 72 is applied to the control input 70 the transmitter 66 produces a driving signal 80. The driving signal 80 has the same time duration as the driving pulse but it includes an AC component having an ultrasonic frequency. Although the exact frequency of the component is not believed to be too important it has been found that when testing plywood a relatively low frequency such as on the order of 40 kilocycles is particularly well suited. The pulse is usually of sufficient duration to permit on the order of 10 or 20 complete cycles of the component to occur during each driving signal.

The output of each transmitter 66 is coupled to the stationary winding 58 in its respective transmitting search unit 26. The driving signal 80 will thereby be coupled into the secondary or rotating winding 56 so as to apply a high voltage, high frequency pulse to the opposite sides of the crystal transducer 52. THis will produce corresponding mechanical vibrations in the transducer 52.

During the driving signal 80 ultrasonic energy will be radiated radially outwardly through the tire 60. The portions of this high frequency energy in the tire 60 radiated into the atmosphere will be immediately attenuated and dissipated. However the portions of the energy in the tire 60 adjacent the "flat" 62 will be coupled into the panel 12. Throughout the duration of the driving signal 80 ultrasonic energy is coupled into the panel 12 whereby the amount of ultrasonic energy in the panel 12 rapidly builds up to a maximum level. This energy is repeatedly reflected or "reverberates" between the front or entrant surface 82 of the panel and the nearest discontinuity.

Figure 7:
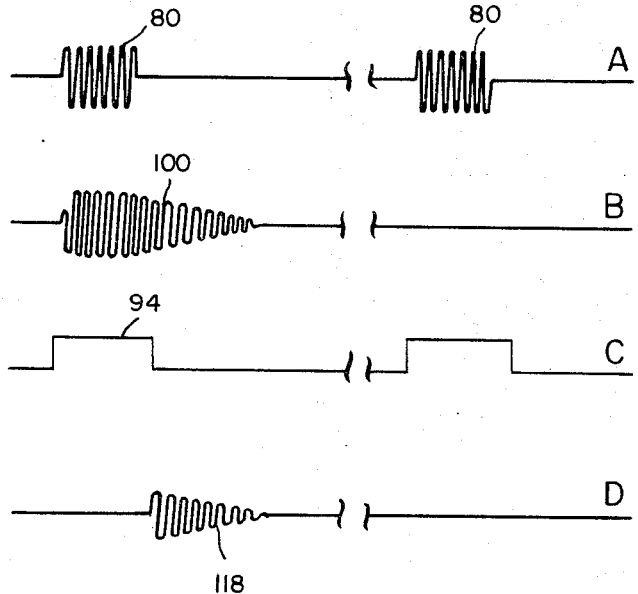
FIG. 7 is a series of waveforms present in various portions of the system.

If the panel 12 is sound the reverberations will be between the front and back surfaces 82 and 84. Under these circumstances the energy reaching the back surface 84 will correspond to the first frame in FIG. 7B If it has a void 16 it will be between the front surface 82 and the void 16 and very little if any energy will reach the back surface 84. Under these circumstances the energy reaching the back surface 84 will correspond to the second frame in FIG. 7B.

As soon as the driving signal 80 terminates and ultrasonic energy is no longer being coupled into the panel 12 the amount of energy therein will tend to exponentially decay. The energy in the portion of the panel 12 adjacent the "flat" 62 on the receiving search unit 28, i.e. the energy in FIG. 7B, will be coupled through the tire 60 to the transducer 52. This incident ultrasonic energy generates a corresponding electrical signal in the rotating winding 56 whereby a similar signal is induced in the stationary winding 58.

Figure 5:
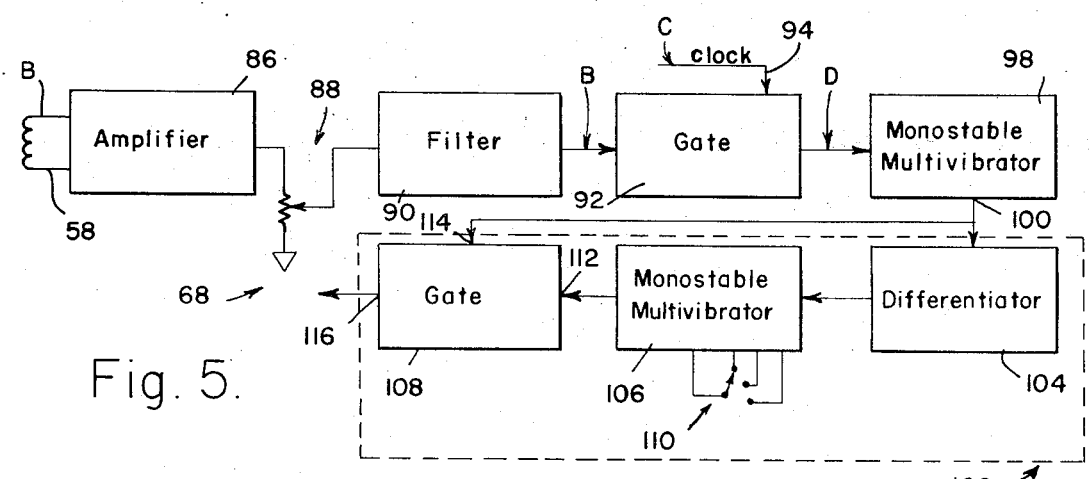
FIG. 5 is a block diagram of one of the receivers utilized in the system of FIG. 2.

Each end of the stationary windings 58 is coupled to its respective receiver 68 for supplying the signal thereto. By way of example the receiver 68 may be similar to that shown in FIG. 5. This receiver 68 includes an amplifier 86 coupled to the stationary winding 58 and effective to greatly increase the amplitude of the signal therefrom. An adjustable gain control 88 may be coupled to the output of the amplifier for setting the amplitude of the amplified signal at the desired level.

The gain control 88 is in turn coupled to a filter 90. This filter 90 is normally of the band pass variety tuned to the frequency of the signals generated in the transmitter 66. As previously stated this is normally in the area of about 40 kilocycles. Because of the large number of channels 64 present in this tester and the presence of surrounding electrical equipment, a considerable amount of electrical noise tends to be coupled into the channels 64. A band pass filter of this nature greatly reduces this spurious noise and improves the signal-to-noise ratio.

The filter 90 may be coupled to a gate 92 having a control input 94. The control input 94 is coupled to the second output 96 of the clock 72 so as to receive the square wave pulses from the multivibrator 78. As a consequence this gate 92 will be effective to open and close in synchronism with the driving signal produced in the transmitter 66. The output from the gate 92 may be coupled to a one shot or monostable multivibrator 98. The astable period for this multivibrator 98 may be on the order of several times longer than the period between the driving signals 80.

In the event the panel 12 is sound, i.e. free from any delaminations 16, the search unit 28 will receive ultrasonic energy and a corresponding electrical signal 100 will be coupled to the receiver 68. If this signal is coupled through the gate 92 the multivibrator 98 will be maintained in its astable condition. However, in the event there is a discontinuity in the workpiece the search unit 28 will not receive any ultrasonic energy and no signal will be coupled to the multivibrator 98.

If the foregoing condition persists for some period of time, for example three or four driving signals 80, the multivibrator 98 will be allowed to return to its normal or stable condition. The multivibrator 98 will remain in this stable condition until the search unit 28 again receives a pulse of ultrasonic energy.

It can thus be seen the level of the output from the multivibrator 98 is effective to indicate a discontinuity 16 is passing between the search units 26 and 28. Normally a relatively small discontinuity in a plywood panel is not sufficiently important to warrant rejecting the panel 12. For example in some instances defects 2 inches or even up to 6 inches or more are not objectionable. If it is acceptable to disregard these minor discontinuities, means may be provided for discriminating between the small and large discontinuities.

In the present instance this is accomplished by providing a size selector 102 that includes a differentiator 104, a monostable multivibrator 106 and a gate 108. Whenever the multivibrator 98 is allowed to switch to its stable condition the initial change will be differentiated in the differentiator 104. The resultant pulse is then coupled into the monostable multivibrator 106 whereby the multivibrator 106 is switched to the astable condition. The multivibrator 106 will remain in this astable condition for a period of time that corresponds to a timer interval required for the panel 12 to travel a distance equal to the maximum permissible size of discontinuity. This size is determined by the setting of the control 110. By way of example this control 110 may have three positions such as small, medium and large corresponding to 2, 4, and 6 inches respectively.

The output from the multivibrator 106 is coupled to an input 112 to gate 108 and is effective to keep the gate 108 closed as long as it is in the astable condition. Another input 114 is coupled to the output 100 of multivibrator 98. If the multivibrator 98 is returned to its astable condition before the multivibrator 106 is returned to its stable condition there will be no signal from the gate 108.

However, if the multivibrator 106 returns to its stable condition first, the gate 108 will open while the multivibrator 98 is in the stable condition. During these circumstances a signal is produced at the output 116 until multivibrator 98 is returned to its astable condition by a signal from the gate 92. It will thus be seen that the loss of a signal for a time shorter than the period of the multivibrator 106 will not produce a defect signal at the gate output 116. However a siganl lost for more than this period will produce a defect signal at the output 116.

It has been found the rotating transformers 54 in the transmitting search units 26 produce alternating magnetic fields of substantial dimensions. In fact very frequently a significant part of the field encompasses at least a portion of one of the rotating transformers 54 in one of the adjacent search units. This cross talk is objectionable particularly when it occurs in one of the receiving units 28. If this condition exists the driving signal 80 in the transmitting search unit 26 will induce a corresponding signal directly into the rotating transformer 54 in the mating receiving search unit 28. This would occur even though ultrasonic energy is not being coupled through the panel 12 into the receiving unit 28. As a consequence the loss of the ultrasonic energy would be overridden and no defects would ever be located.

Magnetic shielding may be provided to inductively separate the search units 26 and 28. However in the present instance the gate 92 is controlled by the gating pulse 94 produced in the clock multivibrator 78. This pulse may have a duration on the order of 125 to 150 percent of the driving signal 80 so as to close the gate 92 during the existence of the driving signal 80. Thus even though a signal may be inductively coupled into the receiving transformer 54 during the driving signal 80 no signals will be coupled beyond the gate 92. However, shortly after the termination of the driving signal 80 gate 92 opens whereby any signals now present may pass therethrough.

If there is any energy reverberating between the front and back surfaces 82 and 84 it will be incident upon the receiving transducer 52 and produce an exponentially decaying signal. Only the trailing portion of this signal will be coupled through the gate and it will be similar to the signal 118 in the first frame of FIG. 7D. If there is a discontinuity 16 there will be no decaying trailing signal 118 and the output from the gate 92 will be free of any signals as in the second frame of FIG. 7D.

The output 116 of each gate 108 is coupled to a multiple relay panel 118. This relay panel 118 is in turn coupled to suitable marking devices such as ink wheels or spray painters 120. When a signal is coupled from the gate 108 in the receiver 6 to the relay panel 118 the relay activates the marker 120 whereby a mark is produced on the panel in line with the search unit 28 which is not receiving the proper signals. It will thus be seen one or more stripes will be provided on any defective panels 12 whereby a visual inspection of the panel 12 will rapidly indicate the location and size of the defect.

In order to utilize the present invention the system 10 is turned "ON" and the size selector 110 is set to the desired level. Initially there will be no panels 12 present at the inspection station 14 and all of the search units 26 and 28 will be in their retracted positions. The plywood panels 12 may now be fed along the conveyor 20. As soon as the leading edge of one panel 12 enters the inspection station 14 it will strike the switch 44. The air is then fed to the cylinders 36 and 42 whereby the search units 26 and 28 are driven into the extended or search position.

The tires 60 on the search units 26 and 28 will engage the panel 12 and roll along parallel bands extending the entire length of the panel 12. Each of the transmitting search units 26 will now be acoustically coupled to the panel 12 at a spot aligned with a spot on the opposite side of the panel 12 where a receiving search unit 28 is also acoustically coupled. In order to insure a proper coupling of both units 26 and 28 the air pressure is high enough to cause a substantial deformation of the tire 60 and a large "flat" 62. However, the pressure is not large enough to compress unbonded laminations together.

As soon as both the transmitting and receiving search units 26 and 28 engage the panel 12 each of the transmitters 66 will periodically circulate driving signals 80 through their respective inner windings 58 on the transmitting search units 26. The driving signals 80 (FIG. 7A) will induce corresponding signals in the second windings 56 whereby corresponding bursts of ultrasonic energy will be transmitted through the "flats" 62 and into the panel 12.

Since the driving signal 80 is normally of extended duration a substantial amount of ultrasonic energy is transferred into the panel 12. This energy tends to reverberate or echo back and forth between the front surface 82 and the closest discontinuity. If the panel 12 is sound the reverberations or repeated reflections are between the front and back surfaces 82 and 84. Accordingly the energy reaching the back surface will correspond to the first frame of FIG. 7B. However if a delamination 16 is present they occur between the delamination 16 and the front surface 82. Very little, if any, of the energy passes the delamination 16 and reaches the back surface 84. Accordingly the energy reaching the back surface 84 will correspond to the second frame of FIG. 7B. The electrical signals in each of the receivers 68 will rapidly build up to a maximum amplitude and remain there as long as the transmitting search units 26 are coupling energy into the panel 12. However, as soon as the driving signal 80 stops and the search unit 26 stops transmitting, the signal in the receiver 68 tends to exponentially deteriorate as best seen in the first frame of FIG. 7B. The gate 92 will then open and allow just the trailing portion to reach the multivibrator 106. This will be effective to maintain the multivibrator in its astable condition. As a consequence, the signal from the gate 108 will remain substantially zero and the relay control will remain inactive and the spray markers will not be operative.

However when the delamination 16 passes between a set (or sets) of search units, the corresponding receiver (or receivers) will not receive a signal. The multivibrator 98 will be allowed to return to its stable condition. This will cause the multivibrator 106 to be switched to its astable condition and the gate 108 closed. It can be seen that even though the signal is lost there is still no signal from the gate 108 at this time. However, if this condition persists beyond the astable period of the multivibrator 106 the multivibrator 106 will return to its stable condition and open the gate 108. Since there is still a signal from the multivibrator 98 a signal will be coupled to the relay whereby the spray painter will be actuated. This will cause a mark or marks to be made on the panel 12 so as to indicate the presence of a defect.

The amount of delay is determined by the selector switch 110 which is set to correspond to the maximum permissible discontinuity. As a consequence anything smaller than this level will not actuate the spray painters whereby the panels remain unmarked.

After the trailing end of the panel has passed through the search units the switch will actuate the air cylinders and retract the search units until such time as the next panel enters the inspection station.

While only a limited number of embodiments of the present invention are disclosed herein, it will be readily apparent to persons skilled in te art that numerous changes and modifications may be made thereto without departing from the spirit of the invention. Accordingly, the foregoing drawings and description thereof are for illustrative purposes only and do not in any way limit the scope of the invention which is defined only by the claims which follow.

I claim:

1. An ultrasonic inspection system for ultrasonically inspecting a workpiece, said system including
   a plurality of transmitting and receiving search units, each of said transmitting search units on one side of a workpiece being adapted to be acoustically coupled to the workpiece for transmitting pulses of ultrasonic energy into the workpiece in response to a driving signal, each of said receiving search units being adapted to be acoustically coupled to the workpiece for receiving ultrasonic energy therefrom and producing electrical signals corresponding thereto,
   transformer means in each of said search units,
   a transmitter coupled to each of the transmitting transformers for applying an electrical driving signal thereto whereby the transmitting search units transmit pulses of ultrasonic energy into the workpiece,
   a receiver coupled to each of the receiving transformers for receiving the electrical signals produced by said pulses of ultrasonic energy incident upon each receiving search unit, and
   gating means in said receiver effective to allow the receiver to be responsive to said electrical signal only during a gating interval that commences after the driving signal.

2. An ultrasonic inspection system for ultrasonically inspecting a workpiece, said system including
   transmitting and receiving search units adapted to be acoustically coupled to the workpiece,
   a transducer rotatably mounted in said transmitting and receiving search units for respectively transmitting ultrasonic energy and receiving ultrasonic energy,
   a rotary transformer in each of said search units coupled to the respective transducer therein,
   transmitting means coupled to the transformer in the transmitting search units, said transmitting means being effective to excite the transmitting means into radiating pulses of ultrasonic energy during a transmit period,
   receiving means coupled to the transformer in the receiving search units, and
   gating means in said receiving means for opening and receiving the electrical signals therefrom during an interval commencing after the transmit period.

3. An ultrasonic inspection system for ultrasonically inspecting bonded workpieces, said system including the combination of:
   a plurality of transmitting wheel search units and a plurality of receiving wheel search units disposed on the opposite sides of the workpiece, a resilient tire of said search units for acoustically coupling the search units to the opposite sides of the workpiece;
   transmitting means and receiving means respectively coupled to the search units for causing ultrasonic energy to be transmitted from the transmitting search units through the workpiece and received by the receiving search units; and retractable means coupled to said search units for compressing said search units against the opposite sides of a workpiece with a predetermined force whenever a workpiece is therebetween, said force being at least large enough to acoustically couple the search units to the workpiece and small enough not to compress unbonded laminations together, said force being large enough to compress said tire sufficiently to couple the search units to the workpiece.

4. An ultrasonic inspection system for ultrasonically inspecting a workpiece, said system including:

a pair of search units, one of said seardh units on one side of a workpiece being adapted to be acoustically coupled to the workpiece for transmitting pulses of ultrasonic energy into the workpiece in response to a driving signal, the other of said search units on the other side of the workpiece being adapted to be acoustically coupled to the workpiece for receiving ultrasonic energy therefrom and producing an electrical signal corresponding to the pulses of ultrasonic energy, rotating transducer means in each of said search units for transmitting and receiving ultrasonic energy;

a rotary transformer in each of said search units coupled to the respective transducer means;

transmitting means coupled to the first of said search units and effective to produce a driving signal, said driving signal being effective to cause the search unit to transmit a pulse of ultrasonic energy, said ultrasonic energy persisting within the workpiece after said driving signal has terminated;

receiving means coupled to the second of said search units for receiving the electrical signals produced thereby, said receiving means being responsive to only the portion of the electrical signal which results from the ultrasonic energy persisting after said driving signal has terminated; and means effective to disable the receiving means during the transmit pulse whereby said receiving means is not responsive to ultrasonic energy during the transmitting pulse.

* * * * *